(12) United States Patent
Masutani et al.

(10) Patent No.: US 7,649,595 B2
(45) Date of Patent: Jan. 19, 2010

(54) METHOD OF FORMING A POLYMER DISPERSED LIQUID CRYSTAL CELL, A CELL FORMED BY SUCH METHOD AND USES OF SUCH CELL

(75) Inventors: Akira Masutani, Stuttgart (DE); Bettina Schueller, Stuttgart (DE); Anthony Roberts, Stuttgart (DE); Akio Yasuda, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 0 days.

(21) Appl. No.: 11/816,329

(22) PCT Filed: Jan. 31, 2006

(86) PCT No.: PCT/EP2006/000822

§ 371 (c)(1),
(2), (4) Date: Feb. 27, 2008

(87) PCT Pub. No.: WO2006/087095

PCT Pub. Date: Aug. 24, 2006

(65) Prior Publication Data

US 2008/0143927 A1      Jun. 19, 2008

(30) Foreign Application Priority Data

Feb. 16, 2005    (EP) .................................. 05003283

(51) Int. Cl.
*G02F 1/1333*    (2006.01)

(52) U.S. Cl. .................. 349/89; 430/20; 252/299.01
(58) Field of Classification Search .................. 349/89; 430/20; 252/299.01; 438/30; 385/27, 37, 385/14, 31
See application file for complete search history.

(56) References Cited

U.S. PATENT DOCUMENTS

| | | | |
|---|---|---|---|
| 5,268,783 A * | 12/1993 | Yoshinaga et al. | 349/88 |
| 5,430,563 A | 7/1995 | Bouteiller et al. | |
| 5,473,450 A * | 12/1995 | Yamada et al. | 349/84 |
| 5,841,493 A | 11/1998 | Lipskier | |
| 2005/0016441 A1 | 1/2005 | Masutani et al. | |
| 2007/0228324 A1 | 10/2007 | Kilickiran et al. | |
| 2009/0121185 A1 * | 5/2009 | Masutani et al. | 252/299.01 |

OTHER PUBLICATIONS

Akira Masutani, et al., "A Novel Polarizer-Free Dye-Doped Polymer-Dispersed Liquid Crystal for Reflective TFT Displays", Journal of the Society for Information Display, XP 002351552, vol. 12, No. 3, 2004, pp. 301-307.

Akira Masutani, et al., "Improved Performance of a Novel Polariser-Free Dye Doped Polymer Dispersed Liquid Crystal for Reflective Display", SID, XP 009055881, 2003, pp. 88-91.

* cited by examiner

*Primary Examiner*—Ellen Kim
(74) *Attorney, Agent, or Firm*—Oblon, Spivak, McClelland, Maier & Neustadt, L.L.P.

(57) ABSTRACT

The present invention relates to a method of forming a polymer dispersed liquid crystal cell. It also relates to a cell produced by such method and to uses of such cells.

30 Claims, 5 Drawing Sheets

Splitting (destructive)

Lift-off (non-destructive)

Figure 1:
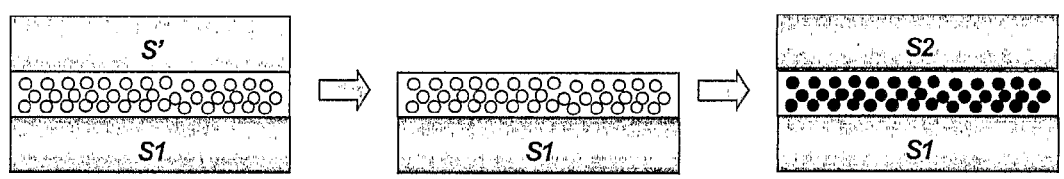

METHOD OF FORMING A POLYMER DISPERSED LIQUID CRYSTAL CELL, A CELL FORMED BY SUCH METHOD AND USES OF SUCH CELL

The present invention relates to a method of forming a polymer dispersed liquid crystal cell. It also relates to a cell produced by such method and to uses of such cells.

Ever since it was first demonstrated, in 1976, that it was possible to change a liquid crystal composite from an opaque to a transparent state, a tremendous amount of research effort has been invested to achieve progress and to adapt this phenomenon for use in electronic components etc. The principle of changing a liquid crystal from an opaque to a transparent state was applied to a porous polymer matrix (Craighead et al., 1982, Appl. Phys. Lett. 40, 22), which was filled with a liquid crystal. The idea of encompassing a liquid crystal within a matrix, which in Craighead's experiments showed a poor performance, was farther developed in 1985 by Fergason (1985, SID Int. Symp. Digest of Tech. Papers, 16, 68) and Drzaic, (1986, J. Appl. Phys., 60, 2142) who reported liquid crystal-polymer composites obtained by drying an emulsion of liquid crystal in an aqueous solution of polyvinyl alcohol. These materials were termed "nematic curvilinear aligned phase" (NCAP) which found use in smart window applications. In NCAP applications the liquid crystal is encapsulated by standard micro-encapsulation or emulsification techniques which suspend it in a solid polymer film.

Another technique which was developed on the basis of Craighead's idea to embed the liquid crystal in a polymer matrix, is the so called PDLC-technique (polymer-dispersed liquid crystal). This is achieved by preparing a homogeneous mixture of a liquid crystal and a pre-polymer and thereafter inducing a phase separation by causing the pre-polymer to form a solid network, thereby inducing the liquid crystal form droplets embedded in the polymer network.

Various techniques have been developed to achieve such formation of a polymer network which are used depending on the individual circumstances. For example, when a pre-polymer material is miscible with a liquid crystal compound a phase separation by polymerization is used. This technique is referred to as polymerization-induced phase separation (PIPS). A homogeneous solution is made by mixing the pre-polymer with the liquid crystal. Thereafter a polymerization is achieved through a condensation reaction, as with epoxy resins, or through a free radical polymerization, as with vinyl monomer catalyzed with a free radical initiator such as benzoyl peroxide; or by a photo-initiated polymerization. Upon polymerization the solubility of the liquid crystal decreases as the polymers lengthen until the liquid crystal forms droplets within a polymer network, or an interconnected liquid crystal network forms within a growing polymer network, or the polymer forms globules within a liquid crystal sea. When the polymer starts to gel and/or crosslink it will lock the growing droplets or the interconnected liquid crystal network thereby arresting them/it in their/its state at that time. The droplet size and the morphology of droplets or the dimensions of the liquid crystal network are determined during the time between the droplet nucleation/initiation of network formation and the gelling of the polymer. Important factors are the rate of polymerization, the relative concentrations of materials, the temperature, the types of liquid crystal and polymers used and various other physical parameters, such as viscosity, solubility of the liquid crystal in the polymer. Reasonably uniform size droplets can be achieved by this technique. Sizes prepared in the past have ranged from 0.01 μm-30 μm. Polymerisation induced phase separation (PIPS) is a preferred method for forming PDLC films. The process begins with a homogeneous mixture of liquid crystal and monomer or pre-polymer. Polymerisation is initiated to induce phase separation. Droplet size and morphology are determined by the rate and the duration of polymerisation, the types of liquid crystal and polymers and their proportions in the mixture, viscosity, rate of diffusion, temperature and solubility of the liquid crystal in the polymer (West, J. L., *Phase-separation of liquid-crystals in polymer*. Molecular Crystals and Liquid Crystals, 1988. 157: p. 427-441, Golemme, A., Zumer, S., Doane, J. W., and Neubert, M. E., *Deuterium nmr of polymer dispersed liquid crystals*. Physical Review a, 1988. 37(2): p. 599-569, Smith, G. W. and Vaz, N. A., *The relationship between formation kinetics and microdroplet size of epoxy based polymer-dispersed liquid-crystals*. Liquid Crystals, 1988. 3(5): p. 543-571, Vaz, N. A. and Montgomery, G. P., Refractive-indexes of polymer-dispersed liquid-crystal film materials—epoxy based system. Journal Of Applied Physics, 1987. 62(8): p 3161-3172). In ultraviolet light (UV) initiated polymerisation, the rate of curing may be changed by changing the light intensity (Whitehead Jr, J. B., Gill, N. L., and Adams, C., *Characterization of the phase separation of the E7 liquid crystal component mixtures in a thiol-ene based polymer*. Proc. SPIE, 2000. 4107: p. 189). The PIPS method using free-radical polymerisation is by far the most studied, and the majority of free-radical polymerisation systems are initiated by UV light. The process has several advantages over other methods such as, better phase separation, uniform droplet size, and better control of the droplet size. However, the presence of dyes that absorb UV and visible radiation in the mixture prior to curing can lead to incomplete or the complete prevention of successful curing. Furthermore, the dyes may decompose upon curing. Moreover, the phase separation is generally not fully complete and so some dyes and liquid crystal may remain trapped in the polymer after curing, the presence of such dyes in the polymer often results in a degradation in the optical performance of the films.

Another technique used for obtaining PDLC composites is thermal induced phase separation (TIPS). This technique can be used for liquid crystal materials and thermoplastic materials which are capable of forming a homogenous solution above the melt temperature of the polymer. The homogenous solution of liquid crystal in the thermoplastic melt is cooled below the melting point of the thermoplastic material, thereby causing a phase separation of the liquid crystal. The droplet size of the liquid crystal is determined by the rate of cooling and a number of other material parameters. Examples of TIPS-prepared composites are polymethylmethacrylate (PMMA) and polyvinylformal (PVF) with cyanobiphenyl liquid crystal. Generally, the concentrations of liquid crystals required for TIPS-film are larger in comparison to PIPS-prepared films.

Another technique used to prepare polymer dispersed liquid crystal composites is solvent-induced phase separation (SIPS). This makes use of a liquid crystal and a thermoplastic material dissolved in a common solvent thereby forming a homogenous solution. The ensuing evaporation of the solvent results in phase separation of the liquid crystal, droplet formation and growth, and polymer gelation. Solvent evaporation can also be used in conjunction with thermal processing of materials which melt below their decomposition temperature. First of all films are formed on a suitable substrate using standard film coating techniques, e.g. doctor blading, spin coating, web coating, etc. The solvent is thereafter removed with no concern of droplets size or density. Then the film is warmed again to re-dissolve the liquid crystal in the polymer and then cooled at a rate which is chosen to give the desired droplet size and density. In effect, the latter example is a combination of SIPS with TIPS.

A further technique used for the construction of PDLC films is the emulsification of the liquid crystal into an aqueous solution of a film-forming polymer ("emulsion method"). This emulsion is coated onto a conductive substrate and allowed to dry. As the film dries, the polymer forms a solid phase which both contains and supports the dispersed liquid crystal droplets. Lamination of a second conductive substrate leads to the final PDLC film. One common feature of emulsion-based systems is that the coating undergoes a significant volume change as the film dries. This shrinkage tends to deform the droplets, which are spherical in solution, into flattened (oblate) spheroids in the PDLC film. This shape anisotropy affects the alignment of the liquid crystal within the film cavities. For example, bipolar droplets in emulsion-based films form with the droplets symmetry axis aligned in the film plane, which in turn affects the electro-optical properties of the film.

Electronic device display technologies require displays with high brightness and contrast, low power consumption, and fast refresh speeds. For flexible displays, polymer thin film technology is being explored and in particular, polymer dispersed liquid crystal films (=PDLC) are of interest. In these materials it is important to achieve good phase separation of the components with minimal co-dissolution. Such co-dissolution reduces the scattering-switching contrast between "on" and "off" states. Furthermore, if coloured dyes are used to produce coloured PDLC films, dissolution of the dye into the inactive polymer matrix reduces colour-switching contrast. An additional impediment is that in the preferred curing method, that of ultra-violet light photo curing, many coloured dyes undergo photodegradation. There are other advantages which would make it appear desirable to add dyes to PDLC composite films. Addition of dipolar dyes can, for example lead to faster "turn-on" times.

Another problem commonly encountered with PDLC composites is the fact that additional components dissolved in the liquid crystal are sensitive to the phase separation process and are frequently damaged in the course of the polymerization and/or the formation of the polymer matrix. For example it is very difficult to include UV-sensitive dyes which survive photo-induced polymerization. Accordingly it has been a problem to produce PDLC-composites that are coloured by the inclusion of dyes.

Some of these problems had been solved by a method reported previously (A Masutani, A. Roberts, B. Schueller, A. Sakaigawa and A. Yasuda, "Improved Performance of a Novel Polariser-Free Dye Doped Polymer Dispersed Liquid Crystal for Reflective Display!, Journal of the SID, Vol. 12/3, EP 01 129 709, A. Masutani, A. Roberts, A. Yasuda, A. Sakaigawa, G. Cross and D. Bloor, "A Novel Polariser-Free Dye Doped Polymer Dispersed Liquid Crystal for Reflective TFT Display", 22nd International Display Research Conference Proceedings, pp 47-50 (2002.10, Nice), A. Masutani, A. Roberts, B. Schueller, A. Sakaigawa and A. Yasuda, "Improved Performance of a Novel Polariser-Free Dye Doped Polymer Dispersed Liquid Crystal for Reflective Display", 23rd International Display Research Conference Proceedings (2003.9, Phoenix)).

In these methods the polymer matrix is formed in the presence of a first material, preferably a liquid crystal material, which—after formation of the polymer matrix—is removed and replaced by a second material that is liquid crystalline. In order for this removal and replacement step to take place, the method involves splitting a cell apart in order to wash out the first material remaining in the polymer matrix. Hence this method is somewhat destructive to the polymer matrix because the polymer matrix is often, in effect, torn in half. Therefore the sponge like polymer dispersed liquid crystal cell fabrication (SPDLC fabrication) is not as reproducible and reliable as one would wish for. Furthermore the splitting of the cell involves a tearing of the matrix which introduces inhomogeneities into the matrix. Furthermore if the cell is formed between two substrates, then these have to be resistant to any solvents that may be used to wash out the first material.

Hence the methods for forming SPDLCs as known from the prior art produces inhomogeneous cells because at some stage of their manufacture they are split apart. Furthermore the methods known from the prior art are only applicable to certain substrates (for example glass) and cannot be applied to substrates that are sensitive to solvents (for example polymeric substrates, OTFT (organic thin film transistors). A further problem associated with methods according to the prior art is that one is restricted to single substrate processing, i.e. one is restricted to the substrates that were originally used for the manufacture of the SPDLC. However, it would be desirable to be able to apply commercially useful manufacturing processes such as roll-to-roll processing.

Accordingly it was an object of the present invention to improve the reproducibility of sponge like polymer dispersed liquid crystal cell fabrication (SPDLC fabrication) in particular of dye doped SPDLC fabrication (D-SPDLC fabrication). It was another object of the present invention to improve the quality and homogeneity of the polymer matrix in such a SPDLC. It was also an object of the present invention to enable commercially useful manufacturing processes such as roll-to-roll processing. Moreover it was an object of the present invention to broaden the choice of substrates that can be used for SPDLCs, in particular D-SPDLCs.

The objects of the present invention are solved by a method of forming a polymer dispersed liquid crystal cell comprising the steps:

a) preparing a porous polymer matrix out of monomers and/or oligomers between a first and a second substrate, wherein pores of said porous polymer matrix are filled with a first material, preferably a first liquid crystal material, b) lifting off said second substrate from a face of said porous polymer matrix, c) removing said first material from said porous polymer matrix, d) placing a third substrate on a face of said porous polymer matrix, from which face said second substrate had been lifted off in step b), e) filling some or substantially all of said pores of said porous polymer matrix with a second material which is liquid crystalline.

In some embodiments, the porous polymer matrix in step a) may also be prepared out of oligomers or oligomers in combination with monomers. Optionally, an initiator may also be present, although such initiator is, for example, not required for PIPS with gamma-rays, TIPS and SIPS, or in a method wherein an emulsion is used ("emulsion method"). Such mixtures comprising monomers and/or oligomers and, optionally, initiators are also herein sometimes referred to as "pre-polymer".

In a preferred embodiment, at least said second substrate has surface properties sufficiently dissimilar to surface properties of said porous polymer matrix, allowing said second substrate to be easily lifted off in step b).

Preferably, said second substrate has a surface layer that is soluble in a first solvent, and step b) is performed after said second substrate has been immersed in said first solvent. For example, said second substrate may be of polymethylmethacrylate, and said first solvent may be methanol.

In one embodiment, said second substrate has substantially hydrophobic surface properties if said polymer matrix has substantially hydrophilic surface properties and vice versa.

Preferably, said second substrate has a contact angle of a solution of monomer, or of a solution of oligomer, or of a solution of prepolymer, as defined above, in the range of from 0 to 180 degrees, preferably from 10 to 180 degrees, more preferably greater than 90 degrees, with respect to said second substrate. The term "contact angle of a solution of . . . ", as used herein, is meant to denote the angle that a drop of a liquid composition of monomer/oligomer/prepolymer (i.e. a solution thereof) adopts when applied to a surface of said second substrate.

In a preferred embodiment, said second substrate has a smooth surface, preferably with a surface roughness not larger than 20 μm.

In one embodiment, said second substrate has a low surface energy and preferably is selected from the group comprising polyethylene terephthalate (PET), polymethylmethacrylate, polyvinyl acetate (PVA), polystyrene, acetal, ethyl vinyl acetate (EVA), polyethylene, polypropylene, polyvinylidene fluoride (PVDF, Tedlar®, polytetrafluorethylene, Teflon®), surface modified glass, e.g. silanised glass.

In one embodiment, said porous polymer matrix is made of a material selected from the group comprising PN393 prepolymer, polymethacrylate, polyurethane, PVA and epoxy. PN393 pre-polymer can be obtained from Merck and FFL Funktionsfluid GmbH, Germany and is a UV-curable acrylate-based polymer.

Preferably, said second substrate is selected from the group comprising PET, polyvinyl acetate (PVA), polystyrene, acetal, ethyl vinyl acetate (EVA), polyethylene, polypropylene, polyvinylidene fluoride (PVDF, Tedlar®, polytetrafluorethylene, Teflon®) and said porous polymer matrix is made of a material selected from the group comprising . . . polymethacrylate, polyurethane, PVA and epoxy.

In one embodiment, said step d) occurs after step e) or concomitantly with step e).

In one embodiment, said step b) occurs after step c).

Preferably, said steps c) and e) occur concomitantly, wherein, more preferably, said steps c), d) and e) occur concomitantly.

In one embodiment, step c) occurs by any one or combinations of the following processes: washing out with a solvent, evaporation, sublimation, degradation, outgassing and suction, wherein, preferably, said second solvent is capable of dissolving said first material, and wherein, more preferably, said second and said first solvent are selected from the group comprising methanol, acetone, toluene, dichloromethane, tetrahydrofuran, (THF), 2-propanol, 1-propanol, water, dimethylformamide (DMF), dimethylsulfoxide (DMSO).

In one embodiment, involving a solvent after step c) there follows step:

c') drying, preferably under vacuum, wherein, preferably, said drying occurs in a temperature range of from 40° C.-100° C., preferably 50° C.-90° C., preferably around 80° C.

In one embodiment, involving a solvent said first substrate is resistant to dissolution in said solvent, wherein, preferably, second substrate is not resistant to dissolution in said solvent.

In one embodiment, at least one of said first and said third substrate is transparent to visible light.

Preferably, said first and said third substrate are electrically conductive or coated with an electrically conductive layer.

In one embodiment, said method includes the additional step:

l) lifting off said first substrate from another face of said porous polymer matrix, which step l) occurs at any one point selected from the following: between a) and b), concomitantly with step b), between b) and c), between c) and d), and between d) and e), concomitantly with steps b) and e), and concomitantly with steps b), c) and e), wherein, preferably, said first substrate has surface properties sufficiently dissimilar to surface properties of said porous polymer matrix allowing said first substrate to be easily lifted off in step l).

In this respect, the term "concomitantly", when used in conjunction with more than one step, e.g. two steps, like b) and e), does not necessarily imply that these two steps be concomitant with each other as well. For example, if step l) is concomitant with both steps b) and e), this only means that step l) occurs at the same time as step b) and at the same time as step e), without b) and e) themselves necessarily being concomitant with each other, although such concomitance is not excluded either.

Preferably, said first substrate has at least one feature as defined in relation to said second substrate above.

In one embodiment, said method comprises the additional step m) placing a fourth substrate on said another face of said porous polymer matrix which step m) occurs after step l), wherein, preferably, said another face of said polymer matrix is opposite to said face where said third substrate is placed in step d).

In one embodiment, said second material, which is liquid crystalline, is dye doped.

Preferably, said first material is a liquid crystal material, wherein, preferably, said first and said second liquid crystal materials are different.

The objects of the present invention are solved by a polymer dispersed liquid crystal cell produced by the method according to the present invention, wherein, preferably, said porous polymer matrix only adheres to one substrate, e.g. said first substrate despite being in contact with said first and said third substrate, or it adheres to no substrate, despite being in contact with said third and said fourth substrate.

The objects of the present invention are solved by the use of a polymer dispersed liquid crystal cell according to the present invention in a display, a smart window, a membrane, an optical valve, a Bragg grating, an optically sensitive memory, an infrared shutter, a gas flow sensor, an optical wavefront sensor, an optical wavefront corrector, a pressure sensor and/or a polarizer.

The inventors have surprisingly found that by using an additional substrate to be used temporarily only which is then lifted off the assembly, one can achieve sponge-like polymer dispersed liquid crystal cells (SPDLCs) which are much more homogenous in terms of pore size and structure and which are much easier to reproduce. Furthermore, a greater versatility of substrates is achieved to the extent that also substrates can be used in the resulting SPDLC which, if they were used from the start of the manufacturing process, would be destroyed by the same.

Figure 2:
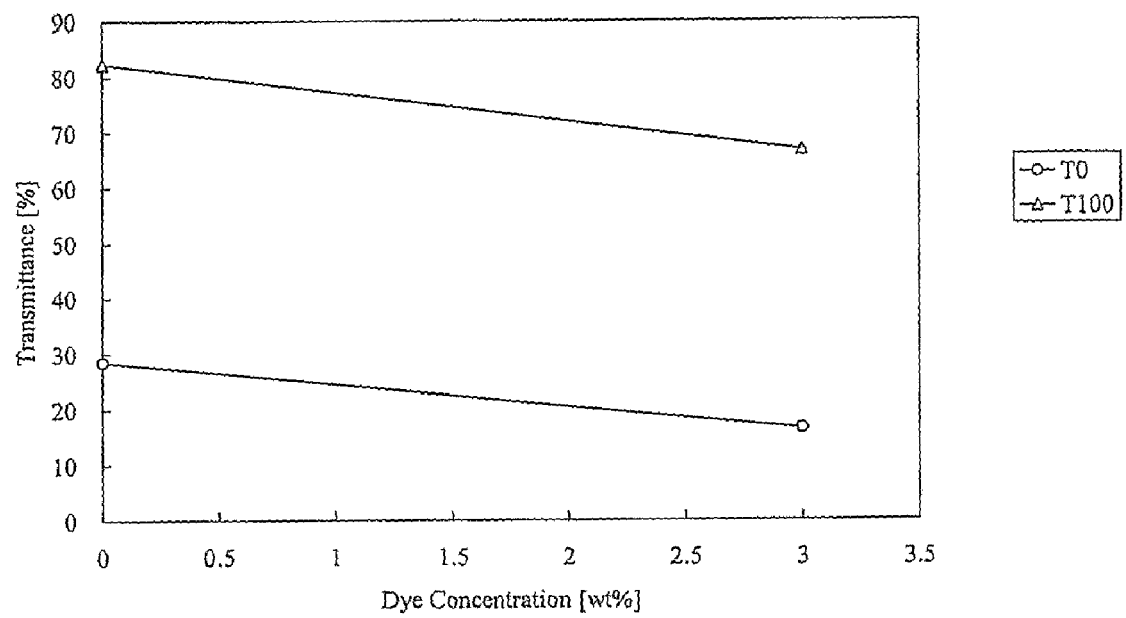
Figure 3:
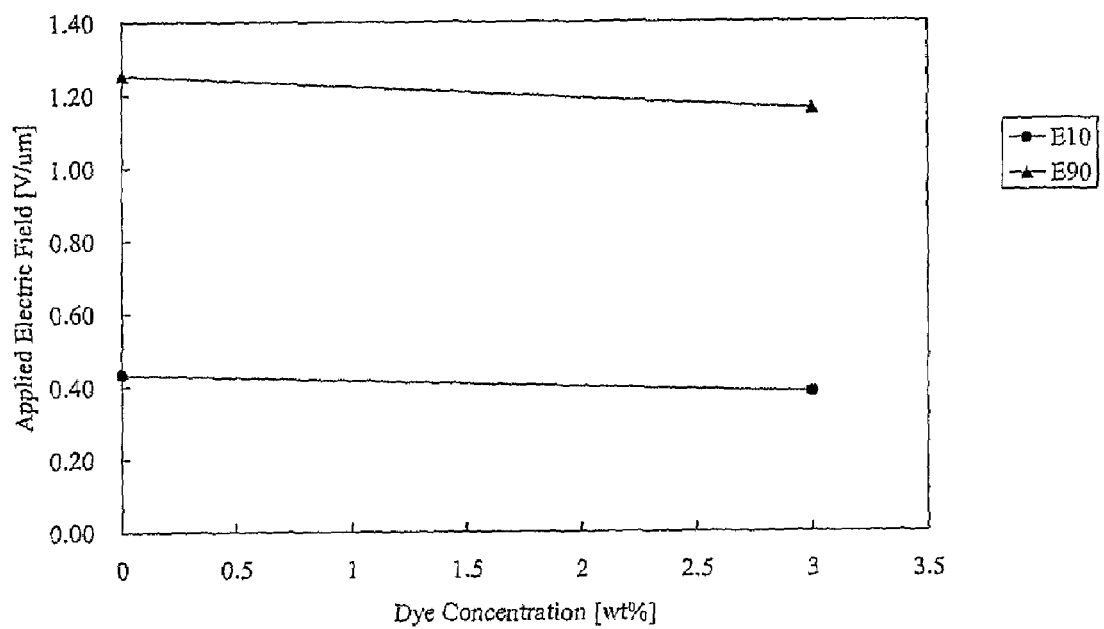
Figure 4:
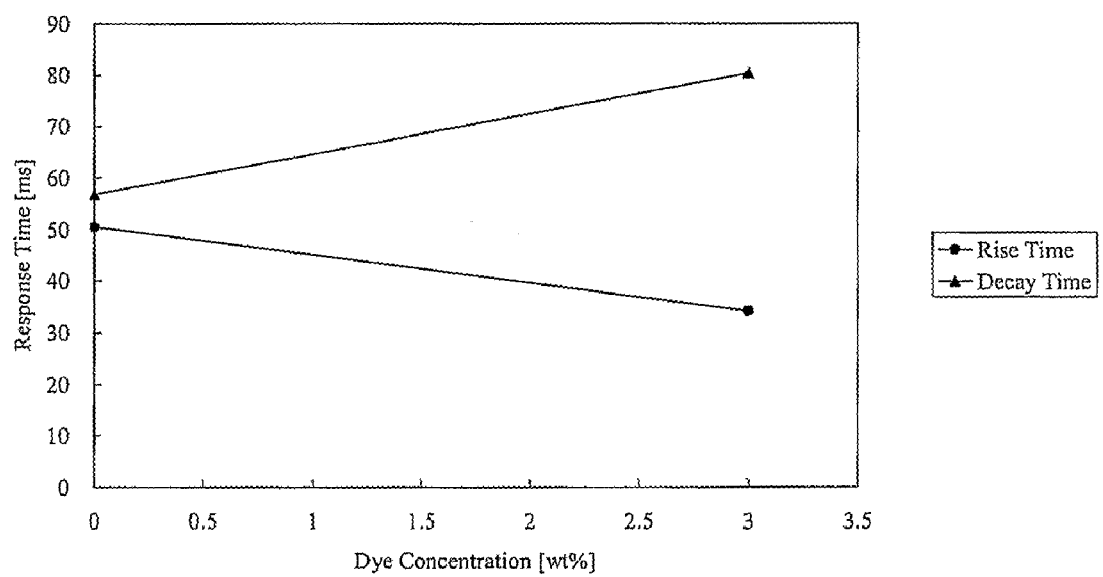

Reference is now made to the figures wherein:

FIG. 1 shows one embodiment of the method according to the present invention, wherein an substrate (S') is used, which is lifted-off from the SPDLC, FIG. 2 shows how the on-state transmittance (T100) and off-state transmittance (T0) vary with dye concentration in a dye doped sponge like polymer dispersed liquid crystal cell (D-SPDLC) according to the present invention, FIG. 3 shows how the driving voltage changes with dye concentration in dye doped sponge like polymer dispersed liquid crystal cells (D-SPDLC) according to the present invention, and FIG. 4 shows the response time characteristics of a flexible D-SPDLC according to the present invention.

Figure 5:
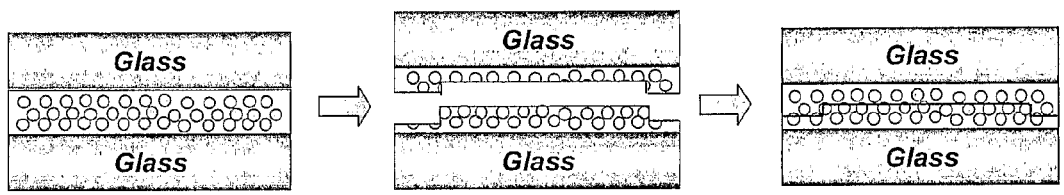
Figure 5:
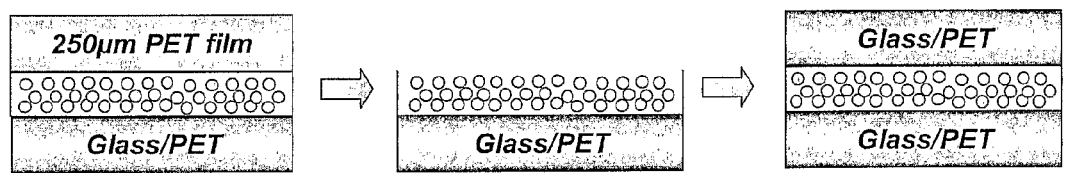

FIG. 5 shows the difference between prior art splitting method and the lift-off method according to the present invention. Not much change can be observed macroscopically (apart from irregular inhomogeneity), but microscopically, destruction of polymer network can be observed with the prior art method, while the lift-off method according to the present invention shows none or less destruction on the polymer matrix formed.

Reference is now made to the following examples which are given to illustrate, not to limit the invention.

EXAMPLE 1

In one embodiment, this invention uses an additional lift-off substrate (S') to which the polymer matrix does not adhere, as shown in FIG. 1. This method allows for the fabrication of polymer matrix on one substrate (S1). LC washout and drying can be done on the S1 that is resistant to the solvent. Another substrate (S2) can be placed on S1 to form a cell with polymer matrix, and then the cell can be refilled with a desirable liquid crystal (LC).

Sample Preparation

For the fabrication of flexible PDLC, the inventors first made a conventional PDLC as described in their previous report [A. Masutani, A. Roberts, A. Yasuda, A. Sakaigawa, G. Cross and D. Bloor, "A Novel Polariser-Free Dye Doped Polymer Dispersed Liquid Crystal for Reflective TFT Display", 22nd International Display Research Conference Proceedings, pp 47-50 (2002.10, Nice)]. The difference is that this time, they used an ITO coated PET film (Sheldahl, 60 Ω/sq & 110 nm ITO, 5 mm thick) for S1 and S2 substrates, and an ordinary PET substrate (Goodfellow, 0.25 mm thick) as an additional substrate to be subsequently lifted off. This is because PN393 polymer does not adhere to uncoated PET.

TL213 LC (Merck) and PN393 UV-curable polymer (FFL Funktionsfluid) were used. TL213 is a chlorinated nematic LC mixture suitable for an active matrix display. TL213 has an extraordinary refractive index ($n_e$) of 1.77, an ordinary refractive index ($n_o$) of 1.53, $\Delta n$ ($=n_e-n_o$) of 0.24 (589 nm at 20° C.), and a dielectric anisotropy ($\Delta\in$) of 5.7. PN393 is a blend of alkyl acrylates with a refractive index of 1.47, and it is cured (polymerized and solidified) by UV light of wavelengths between 350-360 nm.

Firstly, 79 wt % TL213 LC, 81 wt % PN393 pre-polymer and a very small amount of 15 μm spacers were mixed together. Within 6 hours of mixing, the solution was sandwiched between ITO coated PET film (S1) and ordinary PET film (S'). Two additional glass substrates were placed on top of S1 and S' to support the flexible PET film, so that the cell gap would stay at 15 μm uniformly across the cell. This support material is not limited to glass as long as it is a material that allows for the curing of the polymer, and has some rigidity. A pair of bulldog clips was used to hold the substrates together during assembly and curing. The cells were irradiated by UV light (360 nm, Spectroline, Model EN-180L/F, 230V, 50 Hz, 0.17 A) from a distance of 14 mm for 10 minutes at a room temperature of 24° C. As the curing of the polymer progressed, the LC became insoluble in the polymer. This phase separation process leads to the formation of a PDLC film or matrix.

Then the PET substrate S' was lifted off gently, and the LC was fully removed from of the polymer matrix by washing the opened cell with a solvent (in this report methanol) such that the LC was dissolved in the solvent and removed from the matrix. After completely flushing out the LC, the residual solvent was removed from the polymer matrix by placing the cell in a vacuum oven at 80° C. at 20 mBar for 3 hours. The end result was an open porosity sponge consisting of a polymer matrix with cavities (voids) or pores. Then, by placing an ITO coated PET film (S2) on top of the matrix, on top of S1, and re-bonding cells together with a suitable edge adhesive a flexible polymer sandwich cell with the porous polymer matrix of voids was created. The inventors envision that the S2 substrate can be different from the S1 substrate, and it is not limited to PET. Both S1 and S2 are not limited to being a transparent material, although in the case of display one of them should be transparent to visible light, so that one can use the cell as display. Both S1 and S2 must be conductive or have conductive layer such as ITO or FTO, in order to switch the LC display. S1 substrate is not limited to PET, i.e. it can e.g. be an ITO coated glass. In this embodiment, S1 substrate has to be resistant to the solvent used, but S2 substrate does not have to be solvent resistant. For example, one can use organic TFT (OTFT) (organic thin film transistors) as S2. In general OTFT is not resistant against solvent nor is it transparent.

The inventors also envision a process such as roll to roll, for fabricating SPDLCs, wherein a plurality of substrates that exhibit lesser or greater degree of adhesion to the film, is used.

It is to be noted that the adhesion of a substrate to the matrix might be controlled by the effect of polymerization or by the addition of solvent and is dependent on the interplay between matrix and substrate.

Finally, such a cell with a sponge-like texture is referred to as a "Sponge PDLC" (SPDLC) [A. Masutani, A. Roberts, A. Yasuda, A. Sakaigawa, G. Cross and D. Bloor, "A Novel Polariser-Free Dye Doped Polymer Dispersed Liquid Crystal for Reflective TFT Display", 22nd International Display Research Conference Proceedings, pp 47-50 (2002.10, Nice)]. The empty SPDLC cell is refilled with a dye-doped LC by capillary force under vacuum. In our example, the dye used was Black-4 (B4) from Mitsubishi Chemical Japan, which consists of six different azo and anthraquinone dyes mixed together. The LC used for the refilling was different from the initial TL213 LC. In this particular case, TL203, a nematic LC mixture obtainable from Merck was used for the refilling and it has a nematic to isotropic temperature ($T_{NI}$) of 77° C., with an $n_e$ of 1.73, an $n_o$ of 1.53, $\Delta n$ of 0.20 (589 nm at 20° C.), and a $\Delta\in$ of 11.

Finally, after the refilling, the cell was heated to 110° C. for 20 seconds and left until it cooled to room temperature. This annealing process helps to reduce flow alignment defects in the LC introduced during the filling. The temperature can be lower if the LC with low nematic to isotropic temperature is used. This is the only heat applied to substrate S2.

EXAMPLE 2

Characterisation of the Flexible D-SPDLC

The electro-optic response properties of flexible D-SPDLCs, as produced in Example 1, with various 0 wt % and 3 wt % dye concentrations were measured. The test cells were driven using an amplified DAQ PCMCIA card (6024E, National Instruments) controlled using LabWindows CVI software (programmed in-house) running on a laptop. The response of the cells was measured using an optical microscope (DMRX-HC, Leica) fitted with a photodiode (Edmund Optics NT54035). 6 cells were measured in total; 3 cells refilled of 0 wt % B4 (undoped) TL203, 3 cells refilled of 3 wt % B4 (undoped) TL203. Each of the data points represents the average of the measurements taken of the 3 cells.

The flexible D-SPDLC switched as normal D-SPDLC with glass substrates. FIG. 2 shows how the on-state transmittance (T100) and off-state transmittance (T0) vary with dye concentration. One can see that the D-SPDLC cells have moderate scattering (T0=29%) and high on-state transmittance (T100=82%). With the increase of dye concentration, both T0 and T100 decrease as expected.

FIG. 3 shows how driving voltage change with dye concentration. E10 is the electric field required to achieve 10% transmittance of T100, and similarly, E90 is the electric field required to achieve 90% transmittance of T100. With the increase of dye concentration, very small decreases in both E10 and E90 were observed.

FIG. 4 shows the response time characteristic of the flexible D-SPDLC. Rise time is the time taken from when the voltage was applied, to when the cell transmittance reaches 90% of the maximum transmittance (T100). Decay time is the time taken from when the applied voltage is turned off, to when the cell transmittance reaches 10% of the maximum transmittance (T100). The rise time stays under 50 ms and shows slight decrease, while the decay time increases with lithe increase of dye concentration.

The present invention allows for a greater versatility of substrates that are used in sponge like polymer dispersed liquid crystal cells. It furthermore provides for a greater homogeneity, processability and reproducibility of such cells.

The features disclosed in the specification, the claims and/or in the accompanying drawings, may, both separately, and in any combination thereof, be material for realizing the invention in various forms thereof.

The invention claimed is:

1. A method of forming a polymer dispersed liquid crystal cell comprising:
    a) preparing a porous polymer matrix out of monomers and/or oligomers between a first and a second substrate, wherein pores of said porous polymer matrix are filled with a first material,
    b) lifting off said second substrate from a face of said porous polymer matrix,
    c) removing said first material from said porous polymer matrix,
    d) placing a third substrate on a face of said porous polymer matrix, from which face said second substrate had been lifted off in step b), and
    e) filling some or substantially all of said pores of said porous polymer matrix with a second material which is liquid crystalline, wherein said second material is dye doped with a dye consisting of azo, anthraquinone, or azo and anthraquinone,
wherein said steps c) and e) occur concomitantly.

2. The method according to claim 1, wherein at least said second substrate has surface properties sufficiently dissimilar to surface properties of said porous polymer matrix, allowing said second substrate to be easily lifted off in step b).

3. The method according to claim 1, wherein said second substrate has a surface layer that is soluble in a first solvent and that step b) is performed after said second substrate has been immersed in said first solvent.

4. The method according to claim 1, wherein said second substrate has substantially hydrophobic surface properties if said polymer matrix has substantially hydrophilic surface properties and vice versa.

5. The method according to claim 1, wherein said second substrate has a contact angle of a solution of monomer, or of a solution of oligomer, or of a solution of monomer and oligomer, in the range of from 0 to 180 degrees, with respect to said second substrate.

6. The method according to claim 1, wherein said substrate has a surface, with a surface roughness not larger than 20 µm.

7. The method according to claim 1, wherein said second substrate has a low surface energy and is selected from the group comprising polyethylene terephthalate (PET, polymethylmethacrylate, polyvinylacetate (PVA), polystyrene, acetal, ethyl vinyl acetate (EVA), polyethylene, polypropylene, polyvinylidene fluoride (PVDF, tedlar), polytetrafluoroethylene (PTFE, teflon), and surface modified glass.

8. The method according to claim 1, wherein said porous polymer matrix is made of a material selected from the group comprising PN393 prepolymer, polymethacrylate, polyurethane, PVA, and epoxy.

9. The method according to claims 1, 7, or 8, wherein said said second substrate is selected from the group comprising PET, polyvinylacetate (PVA), polystyrene, acetal, ethyl vinyl acetate (EVA), polyethylene, polypropylene, polyvinylidene fluoride (PVDF, tedlar), and polytetrafluorethylene (PTFE, teflon), and said porous polymer matrix is made of a material selected from the group comprising polymethacrylate, polyurethane, PVA, and epoxy.

10. The method according to claim 1, wherein said step d) occurs after step e) or concomitantly with step e).

11. The method according to claim 1, wherein said step b) occurs after step c).

12. The method according to claim 1, wherein said steps c), d) and e) occur concomitantly.

13. The method according to claim 3, wherein step c) occurs by any one or combinations of the following processes: washing out with a second solvent, evaporation, sublimation, degradation, outgassing and suction.

14. The method according to claim 13, wherein said second solvent is capable of dissolving said first material.

15. The method according to claim 14, wherein said second and said first solvent are independently selected from the group comprising methanol, acetone, toluene, dichloromethane, tetrahydrofuran (THF), 2-propanol, 1-propanol, water, dimethylformamide (DMF), and dimethylsulfoxide (DMSO).

16. The method according to claim 1, wherein after step c), the method comprises:
    c') drying under vacuum.

17. The method according to claim 16, wherein said drying occurs in a temperature range of from 20° C.-200° C.

18. The method according to any one of claims 13-17, wherein said first substrate is resistant to dissolution in a solvent.

19. The method according to any one of claims 13-17, wherein the second substrate is not resistant to dissolution in a solvent.

20. The method according to claim 1, wherein at least one of said first and said third substrate is transparent to visible light.

21. The method according to claim 1, wherein said first and said third substrate are electrically conductive or coated with an electrically conductive layer.

22. The method according to claim 1, wherein the method further comprises:
    l) lifting off said first substrate from another face of said porous polymer matrix, wherein step l) occurs at any one point selected from the following: between a) and b), concomitantly with step b), between b) and c), between c) and d), between d) and e), concomitantly with steps b) and e), and concomitantly with steps b), c) and e).

23. The method according to claim 22, wherein said first substrate has surface properties sufficiently dissimilar to surface properties of said porous polymer matrix allowing said first substrate to be easily lifted off in step l).

24. The method according to claim 22 or 23, wherein the method further comprises:

m) placing a fourth substrate on said another face of said porous polymer matrix, wherein step m) occurs after step l).

25. The method according to claim 24, wherein said another face of said polymer matrix is opposite to said face where said third substrate is placed in step d).

26. The method according to claim 1, wherein said first material is a liquid crystal material.

27. The method according to claim 26, wherein said first and said second liquid crystal materials are different.

28. A polymer dispersed liquid crystal cell produced by the method according to claim 1.

29. The cell according to claim 28, wherein said porous polymer matrix only adheres to one substrate, despite being in contact with a first and third substrate or it adheres to no substrate, despite being in contact with a third and fourth substrate.

30. An apparatus comprising:

a display, a smart window, a membrane, an optical valve, a Bragg grating, an optically sensitive memory, an infrared shutter, a gas flow sensor, an optical wavefront sensor, an optical wavefront corrector, a pressure sensor, or a polarizer including the liquid crystal cell of claim 28 or 29.

* * * * *